(12) United States Patent
Carr et al.

(10) Patent No.: US 8,092,125 B2
(45) Date of Patent: Jan. 10, 2012

(54) SAFETY DEVICE FOR A PECK DRILL

(75) Inventors: William B. Carr, Fort Worth, TX (US); William L. Jenkins, Burleson, TX (US)

(73) Assignee: Lockheed Martin Corporation, Bethesda, MD (US)

(*) Notice: Subject to any disclaimer, the term of this patent is extended or adjusted under 35 U.S.C. 154(b) by 1156 days.

(21) Appl. No.: 11/852,889

(22) Filed: Sep. 10, 2007

(65) Prior Publication Data
US 2009/0067939 A1    Mar. 12, 2009

(51) Int. Cl.
*B23B 45/04* (2006.01)

(52) U.S. Cl. ............... 408/17; 408/710; 408/130; 173/4; 173/168

(58) Field of Classification Search .............. 408/17, 408/130, 710, 10, 11; 16/293, 282; 200/50.02, 200/50.13, 43.01, 50.16, 50.17; 173/10, 173/4, 168, 29, 170; 227/8
See application file for complete search history.

(56) References Cited

U.S. PATENT DOCUMENTS

| | | | |
|---|---|---|---|
| 2,657,595 A | * | 11/1953 | Shaff ........................ 408/130 |
| 4,123,188 A | | 10/1978 | Deremo et al. |
| 4,867,617 A | | 9/1989 | Maass et al. |
| 5,073,068 A | | 12/1991 | Jinkins et al. |
| 5,222,844 A | | 6/1993 | Maass et al. |
| 5,295,770 A | | 3/1994 | Pennison et al. |
| 5,328,302 A | | 7/1994 | Eckman |
| 5,340,243 A | | 8/1994 | Deremo |
| 5,348,427 A | | 9/1994 | Deremo |
| 5,374,143 A | | 12/1994 | Deremo |
| 5,533,842 A | | 7/1996 | Johnson et al. |
| 5,833,404 A | | 11/1998 | Johnson et al. |

FOREIGN PATENT DOCUMENTS

WO    89/04228    5/1989

* cited by examiner

*Primary Examiner* — Daniel Howell
*Assistant Examiner* — Paul M Janeski
(74) *Attorney, Agent, or Firm* — Bracewell & Giuliani LLP

(57) ABSTRACT

A pneumatic feed drill has a control unit that repeatedly advances and retracts the drill bit in peck cycles while drilling the hole. The drill has a hydraulic damper cylinder with a damper rod protruding from it that limits the speed of advancement of the drill bit. A retainer device is mounted to the damper rod and prevents the damper rod from resetting to its initial position during the peck cycles. The retainer device releases the damper rod to reset when the drill bit has reached total depth. A safety device is pivotally mounted to the housing and has a closure tab that blocks access to the start button of the drill unless the damper rod is in its initial position.

20 Claims, 3 Drawing Sheets ered by the retainer device of the damper assembly. The actuator tab is contacted by the contact member secured to the retainer device of the damper assembly.

SAFETY DEVICE FOR A PECK DRILL

FIELD OF THE INVENTION

This invention relates in general to handheld drills, and in particular to a pneumatic peck drill having a safety device that prevents the operator from operating the drill unless the damper rod is in its retracted position.

BACKGROUND OF THE INVENTION

A peck drill is a commonly used for drilling holes in products being manufactured. The peck drill has a pneumatic motor that rotates a drill bit. A pneumatic piston advances the drill bit as it is rotated. A hydraulic damper controls the speed at which the piston moves the drill bit forward.

The hydraulic damper has a cylinder and a piston with a rod extending from it, typically in a rearward direction. The pneumatic piston also has a rod that extends from it, normally in a rearward direction. A cross member is mounted to the end of the pneumatic piston rod for movement therewith. A pneumatically actuated retainer member is mounted to the end of the damper rod for movement therewith. The retainer device has a releasable lock that will allow the retainer device and the damper rod to move forward but prevent it from moving rearward unless the total depth of the hole has been reached. The cross member mounted to the piston rod contacts the retainer member and pushes it and the damper rod forward. The speed of the forward movement is restricted by the hydraulic cylinder of the damper assembly.

Being a peck drill, a controller repeatedly retracts the piston rod and the drill bit every few seconds. When the piston rod retracts, the damper rod does not retract because of the retainer device. Consequently, when air pressure is again supplied to the piston, it will advance only until the cross member arm contacts the retainer device. When the total depth is reached, the control unit causes the retainer device to release, enabling the damper rod to move to the fully retracted initial position.

One problem that may occur is that the retainer device will sometimes not release the rod when the total depth has been reached. The piston would still retract normally. The operator would then push the start button to drill a new hole, not realizing that the damper rod is still in the forward position because the damper rod is typically enclosed by a housing. If the operator pushes the start button when the damper rod is still in the forward position, the piston will drive the drill bit forward at an uncontrolled, rapid speed that can damage the work piece.

SUMMARY OF THE INVENTION

In this invention, a housing encloses the damper rod and the start button of the peck drill. The housing has an aperture that provides manual access to the start button. A safety device is pivotally mounted to the housing and in cooperative engagement with the hydraulic damper assembly. The safety device has a closed position that blocks the aperture and access to the start button when the damper rod is in a position other than the initial position. The safety device also has an open position that opens the aperture to provide manual access to the start button when the damper rod is in the initial position.

The safety assembly preferably includes a contact member that is mounted to the retainer device. The retainer device is mounted to the rearward end of the damper rod. The contact member moves in unison with the retainer device and engages the safety device to move it to an open position when the retainer device is located in its initial position.

Preferably, the spring urges the safety device to the closed position. Consequently, the aperture for the start button is closed at all times except when the retainer device for the damper is in the initial position. In the preferred embodiment, the safety device includes a closure tab that is pivotally mounted to the housing. The closure tab rotates to close the aperture and to open the aperture. A linkage member is pivotally mounted to the closure tab. The opposite end of the linkage member is in cooperative engagement with the hydraulic damper assembly. In the preferred embodiment, the opposite end of the linkage member is connected to an actuator tab that is pivotally mounted to the housing. The actuator tab is contacted by the contact member secured to the retainer device of the damper assembly.

DETAILED DESCRIPTION OF THE INVENTION

Figure 1:
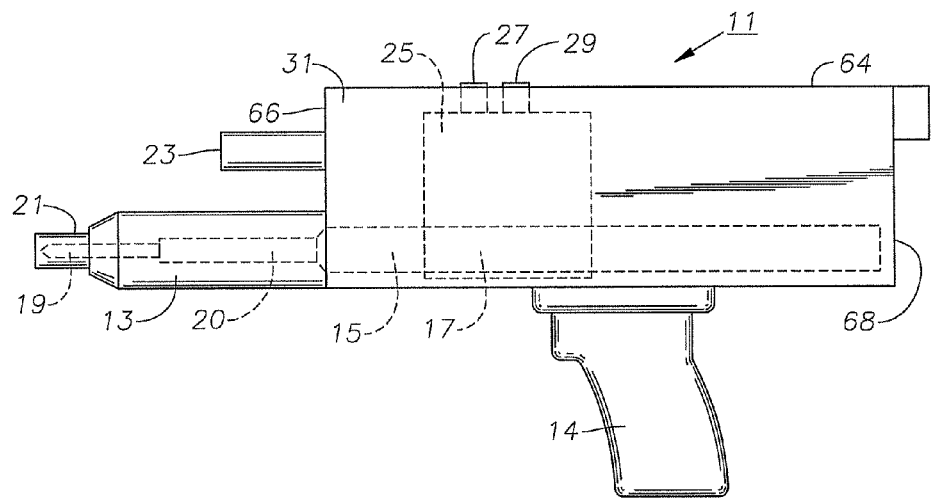
FIG. 1 is a schematic side view of a drill constructed in accordance with this invention.

Referring to FIG. 1, drill 11 has a case 13 and a handle 14 for gripping by an operator. A pneumatic motor 15 and a feed piston and cylinder 17 are shown schematically by dotted lines. Motor 15 rotates a drill bit 19 secured to a chuck 20. Piston 17 advances motor 15, chuck 20 and drill bit 19 while motor 15 is rotating drill bit 19. Drill bit 19 will advance out a nosepiece 21 to drill a work piece (not shown).

A hydraulic damper 23 is mounted to case 13 for controlling the rate at which piston 17 advances drill bit 19. A control unit 25 has a timer that causes piston 17 to retract and move rearward every few seconds, the duration being adjustable. When piston 17 retracts, drill bit 19 will retract from the work piece to free itself of cuttings. Control unit 25 also causes pneumatic pressure to again be supplied to piston 17 to cause it to peck or cycle while drilling the hole.

Figure 2:
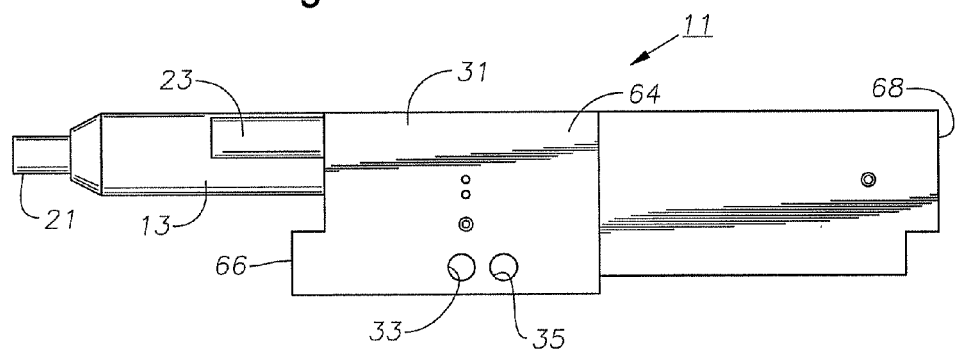
FIG. 2 is a schematic top view of the drill of FIG. 1.

Drill 11 has a start button 27 that must be pressed by the operator to initially begin drilling a hole. The operator does not press start button 27 each time a peck cycle occurs, rather presses start button 27 only when beginning to drill a new hole. Normally, drill 11 will also have an emergency stop button 29 that enables the operator to stop operation of drill 11 at any point. Referring to FIG. 2, a housing 31 mounts to case 13 and encloses control unit 25. Housing 31 has a start aperture 33 that provides access to start button 27. Housing 31 also has a stop aperture 35 that provides manual access to emergency stop button 29. Housing 31 is not shown in FIGS. 3 and 4.

Figure 3:
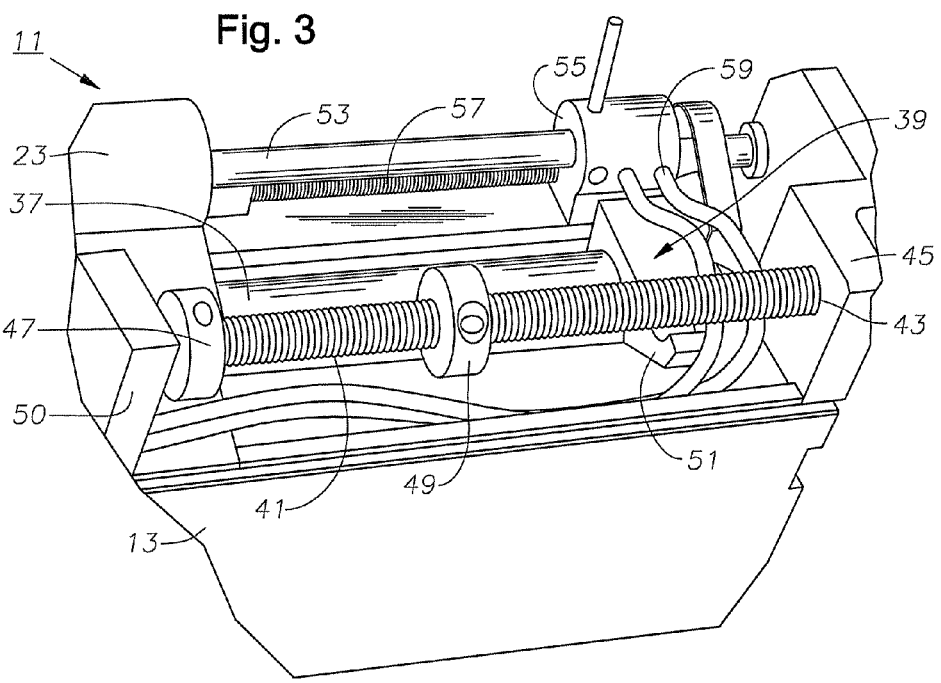
FIG. 3 is a perspective view of portions of the drill with the housing removed and showing the retainer device and the damper piston rod in an initial position.
Figure 4:
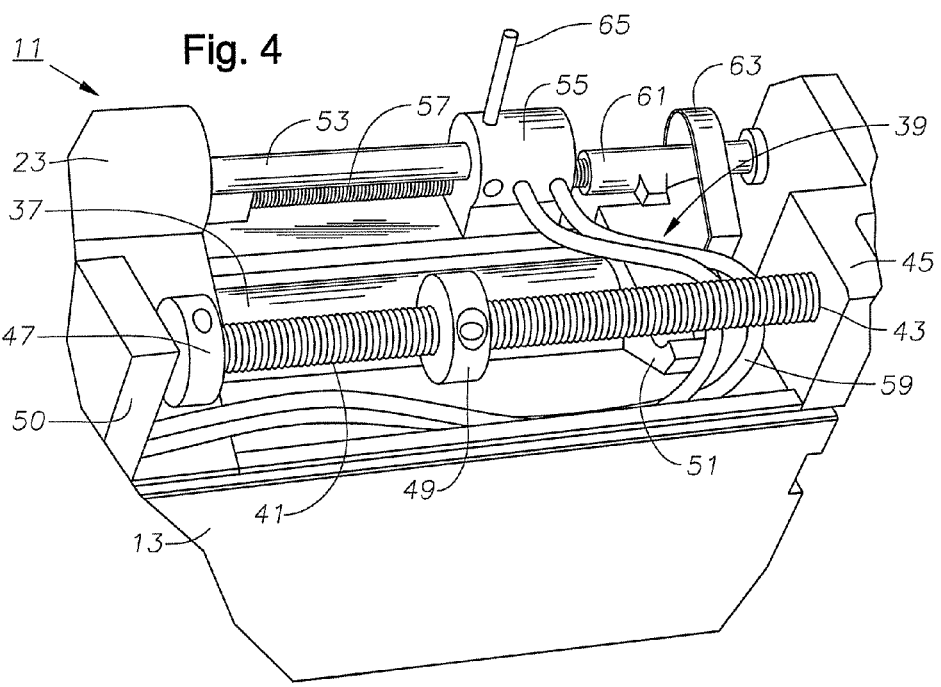
FIG. 4 is a view similar to FIG. 3, but showing the retainer device and the damper piston rod in an intermediate position.

Referring to FIGS. 3 and 4, a piston rod 37 protrudes rearward from pneumatic piston 17 (not shown). Piston rod 37 strokes in unison with piston 17. A cross member 39 is attached to the rearward end of piston rod 37 for movement therewith. A reset rod 41 is located parallel to piston rod 37. In this embodiment, reset rod 41 is threaded. Reset rod 41 is capable of limited longitudinal movement along its longitudinal axis and does not rotate. The rearward end 43 of reset rod 41 is not in threaded engagement with rear bullhead 45. A stop member 47 can be releasably set along the length of reset rod 41 at a desired point. Stop member 47 is a ring that can be rotated to a desired point on rod 47 and secured by a set screw. Stop member 47 will contact a pneumatic reset switch (not shown) to switch a valve when reset rod 41 moves forward a short distance. Although not shown, the reset switch is mounted to forward bulkhead 50, which is part of case 13.

A depth selector 49 is also mounted to reset rod 41. Depth selector 49 is a ring similar to stop member 47 and is positioned along reset rod 41 rearward of stop member 47 a selected distance. Depth selector 49 determines the total hole depth or the length of the stroke of piston 17 (FIG. 1).

Cross member 39, which moves in unison with piston rod 37, has a depth arm 51 extending laterally from piston rod 37 for contacting depth selector 49 when the total depth or selected stroke length is reached. When contacting depth selector 49, cross member 39 will force depth selector 49, reset rod 41, and stop member 47 forward a short distance until stop member 47 depresses the reset switch (not shown) on forward bulkhead 50. Control unit 25 (FIG. 1) will then cause piston rod 37 to retract to the initial position shown in FIG. 3. Also, since this is a peck drill, control unit 25 (FIG. 1) will repeatedly advance and retract piston rod 37 numerous times before cross member arm 51 contacts depth selector 49.

Hydraulic damper 23 has a damper rod 53 that extends rearward from a piston contained within its cylinder. Damper rod 53 is biased toward the rearward direction by a spring (not shown). Damper rod 53 is attached to a hydraulic piston (not shown) that restricts the speed of the forward movement of damper rod 53. An adjustable orifice (not shown) is located between the forward and rearward sides of the piston. Hydraulic damper 23 is conventional.

A conventional retainer device 55 is mounted to the rearward end of damper rod 53 for movement therewith. Retainer device 55 will advance forward with damper rod 53 while the hole is being drilled, as can be seen by comparing FIGS. 3 and 4. Retainer device 55 has a gripping portion that encircles a stationary rod 57. Stationary rod 57 is also threaded in this example and is parallel to reset rod 41 and piston rod 37. Stationary rod 57 does not move forward or rearward and does not rotate. Air tubes 59 from control unit 25 (FIG. 1) lead to retainer device 55 for causing a collet-type gripping member within it to grip stationary rod 57, which prevents movement of damper rod 53 in the rearward direction but allows movement in the forward direction. When retainer device 55 is released, the spring within hydraulic damper 23 pushes damper rod 53 back rearward until contacting an adjustable stop 61 (FIG. 4).

Cross member 39 has a damper arm 63 that extends laterally from piston rod 37 opposite depth arm 51. Cross member damper arm 63 contacts retainer device 55 to push it forward, along with damper rod 53 when piston rod 37 is being moved forward. As shown in FIG. 4, when piston rod 37 retracts prior to reaching its total depth to perform a peck cycle, retainer device 55 retains damper rod 53 in the intermediate position that existed prior to piston rod 37 retracting for a peck cycle.

The safety assembly of this invention includes a contact member 65. Contact member 65 is a pin or rod that extends from retainer device 55 in a direction perpendicular to the axis of damper rod 53. Contact member 65 is mounted to retainer device 55 for movement in unison with it.

Figure 5:
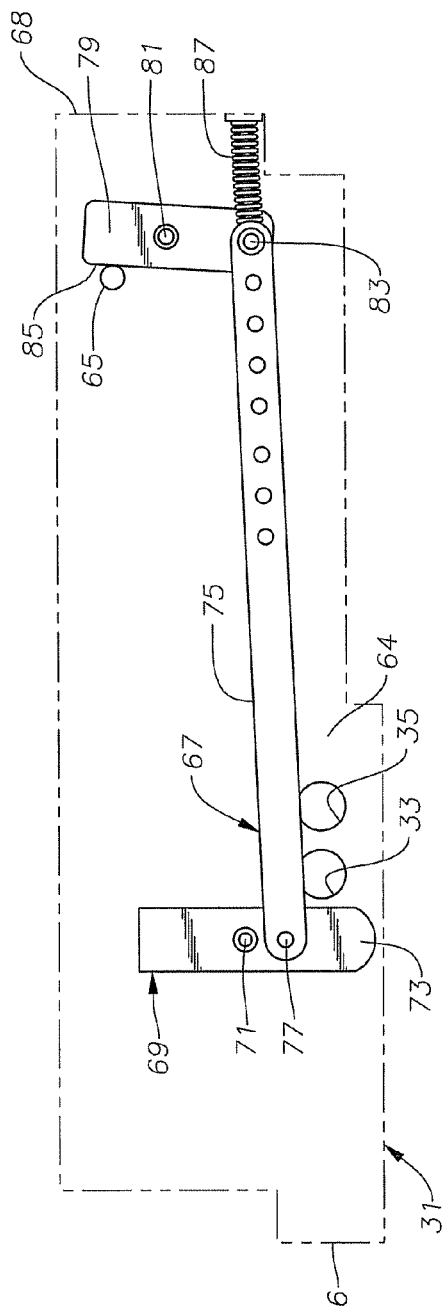
FIG. 5 is a top view of the safety device for the drill of FIG. 1, with the dotted lines illustrating the top of the housing of the drill of FIG. 1, and showing the safety device in an open position.
Figure 6:
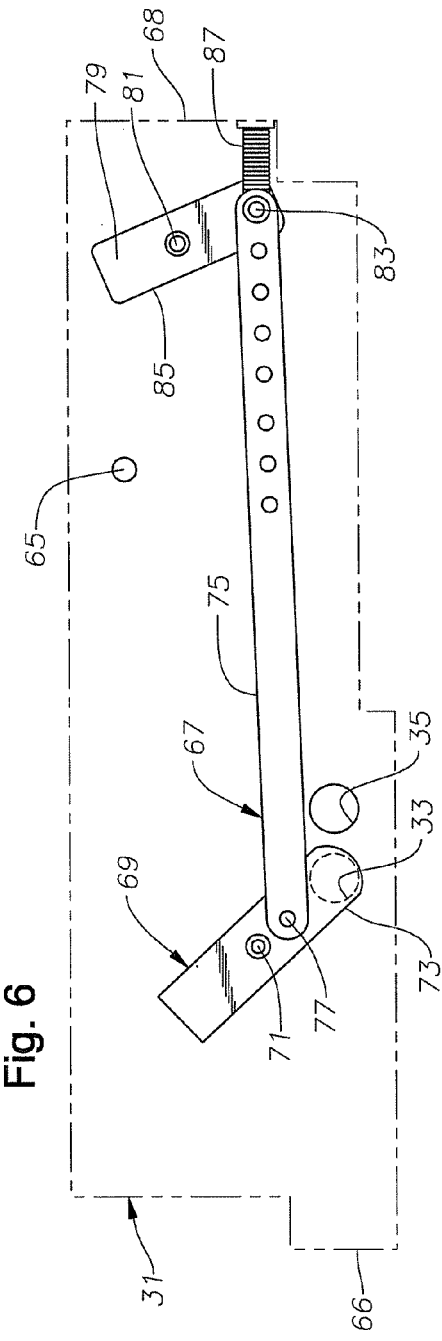
FIG. 6 is a top view of the safety device similar to FIG. 5, but showing the safety device in a closed position.

Referring to FIGS. 5 and 6, a safety device 67 is mounted to housing 31. Housing 31 has a top plate 64, a forward end 66 and a rearward end 68. Safety device 67 is mounted to the interior surface of housing top 64. Safety device 67 includes a closure tab 69, which is pivotally mounted to housing top 64 closer to forward end 66 than rearward end 68. Closure tab 69 is mounted to housing top 64 by a pivot pin 71 that allows closure tab 69 to rotate between the open position in FIG. 5 and the closed position of FIG. 6. Closure tab 69 has a closure end 73 that closes or blocks start aperture 33 while in the closed position of FIG. 6.

Safety device 67 includes an elongated linkage member 75 that is pivotally connected to closure tab 69 by a pivot pin 77. In this example, pivot pin 77 is located offset from pivot pin 71 and on closure tab end portion 73. Linkage member 75 extends generally rearward from closure tab 69 to an actuator tab 79. Actuator tab 79 is pivotally mounted to housing top 64 by a pivot pin 81. Linkage member 75 is pivotally connected to actuator tab 79 by a pivot pin 83. Pivot pin 83 is offset from pivot pin 81. Actuator tab 79 has a contact edge or point 85 on a portion that is opposite pivot pin 83 and also offset from pivot pin 81. Contact point 85 is contacted by contact member 65, which is also shown in FIGS. 3 and 4, when damper rod 53 is its initial, fully retracted position.

A spring 87 is secured between pivot pin 83 and a point on rearward end 68 of housing 31. Spring 87 urges actuator tab 79 to rotate counter clockwise, which in turn urges closure tab 69 to the closed position of FIG. 6. When contact member 65 is bearing against contact point 85, as shown in FIG. 5, the force of spring 87 is overcome, causing closure tab 69 to move to the open position of FIG. 5. When contact member 65 moves forward during drilling of a hole, as illustrated in FIG. 6, it no longer is in contact with contact point 85, which results in spring 87 moving closure tab 69 to the closed position.

In operation, when a hole is to be drilled, initially drill 11 will appear as in FIG. 3, except that normally housing 31 would cover the components shown. Damper rod 53 is in its fully retracted or rearward position. Pneumatic piston rod 37 is also in its fully retracted or rearward position. As shown in FIG. 5, in this position, contact member 65 will be bearing against contact point 85 of actuator tab 79. Actuator tab 79 and closure tab 69 will be rotated counterclockwise to expose start aperture 33. The operator pushes start button 27 (FIG. 1), which causes air pressure to be supplied to motor 15 and pneumatic piston 17. Drill bit 19 advances from nose 21 and begins drilling the work piece. Pneumatic piston rod 37 advances forward as the hole is being drilled. Cross member 39 moves forward with it, pushing against retainer device 55. Retainer device 55 pushes damper rod 53 forward, which controls the rate of advancement.

A few seconds later, control unit 25 (FIG. 1) will signal piston 17 to retract to perform a peck cycle. As shown in FIG. 4, piston rod 37 retracts, but damper rod 53 does not retract because retainer device 55 continues to engage stationary rod 57. Shortly after retracting, control unit 25 again supplies pressure to piston 17 to advance drill bit 19. Piston rod 37 will move rapidly forward until cross member damper arm 63 contacts retainer device 55 which has remained at the intermediate position it was in just before piston rod 37 retracted for a peck cycle. The drilling and peck cycles will continue with retainer device 55 and damper rod 53 gradually moving forward.

Once retainer device 55 moves a short distance forward from its initial position, contact member 65 will lose contact with actuator tab 79 (FIG. 5). Spring 87 causes linkage member 75 to rotate actuator tab 79 from the position from FIG. 5 to the position of FIG. 6. This rotation pulls linkage member 75 rearward, which causes closure portion 73 of closure tab 69 to cover start aperture 33 as shown in FIG. 6. Closure tab 69 remains in the closed position during the peck cycles.

Eventually, cross member depth arm 51 will contact depth selector 49 and push reset rod 41 a short distance forward. This signals control unit 25 (FIG. 1) to cause piston rod 37 to retract to the rearward position of FIG. 3. At the same time, control unit 25 causes retainer device 55 to release its engagement with stationary rod 57. The spring within damper 23 pushes damper rod 53 and retainer device 55 to the rearward or initial position shown in FIG. 3. When this occurs, contact member 65 will again engage contact point 85 of actuator tab 79, as shown in FIG. 5, and cause actuator tab 79 to rotate. The rotation of actuator tab 79 pushes linkage member 75 forward to rotate closure tab 69 to the open position of FIG. 5.

When the operator has positioned drill 11 for drilling a new hole, access will be provided through start aperture 33 to start button 27 (FIG. 1). If a malfunction causes damper rod 53 to remain in the forward position, even though the total depth had been reached, the operator would not be able to start drilling a new hole because closure tab 69 would still be in the closed position in FIG. 6. Closure tab end portion 73 keeps aperture 33 closed at all times except when the damper piston rod is in the initial position and a short distance after a new hole has been started. Stop aperture 35 always remains open regardless of the position of the safety device 67.

The invention has significant advantages. The safety device ensures that the operator will not be able to start drilling a new hole unless the damper rod has fully retracted to its initial position. The safety feature does not require the operator to visually make any determination as to whether or not the damper rod has retracted. The device is simple and easy to install on existing commercially available peck drills.

While the invention has been shown in only one of its forms, it should be apparent to those skilled in the art that it is not so limited but is susceptible to various changes without departing from the scope of the invention. For example, different linkage arrangements may be employed other than the one shown. The contact member could be attached to a portion of the damper rod, rather than the retainer device for the damper rod. Rather than rotating to open and close the start hole, the movement of the closure tab could be linear.

The invention claimed is:

1. In a peck drill having a start button for actuating a motor to rotate and a piston to advance a drill bit, a hydraulic damper assembly including a hydraulic cylinder and a damper rod for limiting the speed of advancement of the drill bit, the hydraulic damper assembly including a retainer device that prevents the damper rod from resetting to an initial position when the piston retracts the drill bit during a peck cycle, and the retainer device releasing the damper rod to reset when the drill bit is at total depth, the improvement comprising:
   a housing enclosing the damper rod and the start button, the housing having an aperture that provides manual access to the start button; and
   a safety device pivotally mounted to the housing and in cooperative engagement with the hydraulic damper assembly, the safety device having a closed position that blocks the aperture and access to the start button when the damper rod has moved from the initial position, and an open position that opens the aperture to provide access to the start button when the damper rod is in the initial position.

2. The drill according to claim 1, wherein the retainer device moves in unison with the damper rod, and the drill further comprises:
   a contact member mounted to the retainer device for movement therewith, the contact member engaging the safety device to move the safety device to the open position when the retainer device is located in the initial position.

3. The drill according to claim 1, wherein the retainer device moves in unison with the damper rod, and the drill further comprises:
   a contact member mounted to the retainer device for movement therewith, the contact member being positioned to engage a contact point on the safety device to move the safety device to the open position when the retainer device is located in the initial position, the contact member moving away from the contact point as the retainer device moves away from the initial position.

4. The drill according to claim 1, further comprising:
   a spring that urges the safety device to the closed position.

5. The drill according to claim 1, wherein the safety device comprises:
   a closure tab pivotally mounted to the housing at a pivot point, the closure tab closing the aperture while the safety device is in the closed position and opening the aperture while the safety device is in the open position;
   a linkage member having a first end pivotally mounted to the closure tab offset from the pivot point, the linkage member having a second end in cooperative engagement with the hydraulic damper assembly for moving the closure tab to close the aperture when the damper rod is in the initial position; and
   a spring connected between the housing and the linkage member for urging the linkage member to move the closure tab to close the aperture.

6. The drill according to claim 1, wherein the safety device comprises:
   a closure tab pivotally mounted to the housing at a first pivot point, the closure tab closing the aperture while the safety device is in the closed position and opening the aperture while the safety device is in the open position;
   a linkage member having a first end pivotally mounted to the closure tab offset from the first pivot point;
   an actuator tab pivotally mounted to the housing at a second pivot point, the linkage member having a second end pivotally connected to the actuator tab offset from the second pivot point; and
   the actuator tab being in cooperative engagement with the hydraulic damper assembly for moving the linkage member to cause the closure tab to close the aperture when the damper rod is in the initial position.

7. The drill according to claim 1, wherein:
   the retainer device moves in unison with the damper rod;
   a contact member is mounted to the retainer device for movement in unison therewith; and
   the safety device comprises:
   a closure tab pivotally mounted to the housing at a first pivot point, the closure tab closing the aperture while the safety device is in the closed position and opening the aperture while the safety device is in the open position;
   a linkage member having a first end pivotally mounted to the closure tab offset from the first pivot point;
   an actuator tab pivotally mounted to the housing at a second pivot point, the linkage member having a second end pivotally connected to the actuator tab offset from the second pivot point;
   the contact member contacting the actuator tab to move the linkage member to cause the closure tab to close the aperture when the damper rod is in the initial position; and a spring connected between the housing and the linkage member for urging the linkage member to move the closure tab to close the aperture.

8. The drill according to claim 1, wherein the safety device moves from the open position to the closed position a short distance after the piston begins to advance and returns back to the open position at the conclusion of drilling the hole, independently of the depth of the hole.

9. A pneumatic peck drill, comprising:
   a pneumatic motor and a pneumatic piston for rotating and advancing a drill bit;
   a hydraulic cylinder having a damper rod protruding therefrom for limiting the speed of advancement of the drill bit;
   a retainer device in engagement with the damper rod for movement therewith, the retainer device preventing the damper rod from resetting to an initial position while the piston retracts the drill bit during a peck cycle, and the retainer device releasing the damper rod to reset when the drill bit is at total depth;
   a housing enclosing the damper rod and the start button, the housing having an aperture that provides manual access to the start button;
   a safety device pivotally mounted to the housing, the safety device having a closure tab that has a closed position, blocking the aperture in the housing when the damper rod is not substantially in the initial position;
   a contact member mounted to the retainer device for movement therewith, the contact member engaging the safety device to move the closure tab to the open position while the damper rod is in the initial position; and
   a spring mounted between the safety device and the housing to urge the closure tab to the closed position.

10. The drill according to claim 9, wherein the closure tab is pivotally mounted to the housing for rotational movement about a pivot pin between the open and closed positions.

11. The drill according to claim 9, wherein the closure tab is pivotally mounted to the housing for rotational movement about a first pivot pin between the open and closed positions, and the safety device further comprises:
   a linkage member having a first end pivotally mounted to the closure tab offset from the first pivot pin;
   an actuator tab pivotally mounted to the housing for rotation about a second pivot pin, the linkage member having a second end pivotally connected to the actuator tab offset from the second pivot pin; and wherein
   the contact pin contacts the actuator tab to move the linkage member to cause the closure tab to close the aperture when the damper rod is substantially in the initial position.

12. The drill according to claim 11, wherein the contact pin contacts the actuator tab at a point offset from the second pivot pin and on a side of the second pivot pin opposite where the second end of the linkage member is mounted to the actuator tab.

13. The drill according to claim 11, wherein the linkage member pivotally mounts to the closure tab on a same side of the first pivot pin as the portion of the closure tab that closes the aperture.

14. A safety assembly for a pneumatic peck drill having a start button for actuating a pneumatic motor to rotate and a pneumatic piston to advance a drill bit, a hydraulic damper assembly including a hydraulic cylinder and a damper rod for limiting the speed of advancement of the drill bit, the hydraulic damper assembly including a retainer device that prevents the damper rod from resetting to an initial position when the piston retracts the drill bit during a peck cycle, and releases the damper rod to reset when the drill bit is at total depth, the safety device comprising:
   a housing for mounting to the drill and enclosing the damper rod and the start button, the housing having an aperture for providing manual access to the start button; and
   a safety device pivotally mounted to the housing for cooperative engagement with the hydraulic damper assembly, the safety device having a closed position that blocks the aperture when the damper rod is not in the initial position, and an open position that opens the aperture to provide access to the start button when the damper rod is substantially in the initial position.

15. The safety assembly according to claim 14, wherein the safety assembly further comprises:
   a contact member for mounting to the retainer device for movement therewith, the contact member engaging the safety device to move the safety device to the open position when the retainer device is located in the initial position.

16. The safety assembly according to claim 14, further comprising:
   a contact member for mounting to the retainer device for movement therewith, the contact member being positioned to engage a contact point on the safety device to move the safety device to the open position when the retainer device is located in the initial position, the contact member moving away from the contact point as the retainer device moves away from the initial position.

17. The safety assembly according to claim 14, further comprising:
   a spring that urges the safety device to the closed position.

18. The safety assembly according to claim 14, wherein the safety device comprises:
   a closure tab pivotally mounted to the housing at a pivot point, the closure tab closing the aperture while the safety device is in the closed position and opening the aperture while the safety device is in the open position;
   a linkage member having a first end pivotally mounted to the closure tab offset from the pivot point, the linkage member having a second end for cooperative engagement with the hydraulic damper assembly for moving the closure tab to close the aperture when the damper rod is in the initial position; and
   a spring connected between the housing and the linkage member for urging the linkage member to move the closure tab to close the aperture.

19. The safety assembly according to claim 14, wherein the safety device comprises:
   a closure tab pivotally mounted to the housing at a first pivot point, the closure tab closing the aperture while the safety device is in the closed position and opening the aperture while the safety device is in the open position;
   a linkage member having a first end pivotally mounted to the closure tab offset from the first pivot point;
   an actuator tab pivotally mounted to the housing at a second pivot point, the linkage member having a second end pivotally connected to the actuator tab offset from the second pivot point; and
   the actuator tab adapted to be in cooperative engagement with the hydraulic damper assembly for moving the linkage member to cause the closure tab to close the aperture when the damper rod is in the initial position.

20. The safety assembly according to claim 14, further comprising:

a contact member for mounting to the retainer device for movement in unison therewith; and wherein the safety device comprises:

a closure tab pivotally mounted to the housing at a first pivot point, the closure tab closing the aperture while the safety device is in the closed position and opening the aperture while the safety device is in the open position;

a linkage member having a first end pivotally mounted to the closure tab offset from the first pivot point;

an actuator tab pivotally mounted to the housing at a second pivot point, the linkage member having a second end pivotally connected to the actuator tab offset from the second pivot point;

the contact member contacting the actuator tab to move the linkage member to cause the closure tab to close the aperture when the damper rod is in the initial position; and a spring connected between the housing and the linkage member for urging the linkage member to move the closure tab to close the aperture.

* * * * *